US012225641B2

(12) United States Patent
Cervera et al.

(10) Patent No.: US 12,225,641 B2
(45) Date of Patent: Feb. 11, 2025

(54) BAKE DEVICES FOR HANDLING AND UNIFORM BAKING OF SUBSTRATES

(71) Applicant: Applied Materials, Inc., Santa Clara, CA (US)

(72) Inventors: Hiram Cervera, Santa Clara, CA (US); Yongan Xu, Santa Clara, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 664 days.

(21) Appl. No.: 17/119,377

(22) Filed: Dec. 11, 2020

(65) Prior Publication Data

US 2021/0195695 A1 Jun. 24, 2021

Related U.S. Application Data

(60) Provisional application No. 62/951,909, filed on Dec. 20, 2019.

(51) Int. Cl.

| | |
|---|---|
| ***H05B 3/74*** | (2006.01) |
| ***F27D 5/00*** | (2006.01) |
| ***H05B 3/28*** | (2006.01) |
| ***H05B 3/62*** | (2006.01) |

(52) U.S. Cl.

CPC ............... *H05B 3/748* (2013.01); *F27D 5/00* (2013.01); *H05B 3/283* (2013.01); *H05B 3/62* (2013.01)

(58) Field of Classification Search

CPC .. F27D 5/00; H05B 3/283; H05B 3/62; H05B 3/748

See application file for complete search history.

(56) References Cited

U.S. PATENT DOCUMENTS

| | | | | |
|---|---|---|---|---|
| 6,407,368 | B1 | 6/2002 | Hsu et al. | |
| 2001/0010307 | A1* | 8/2001 | Saito | C30B 31/12 219/390 |
| 2003/0183614 | A1 | 10/2003 | Yamaguchi et al. | |
| 2004/0163683 | A1* | 8/2004 | Sugimoto | H01L 21/67034 134/148 |
| 2006/0011605 | A1 | 1/2006 | Lee et al. | |

(Continued)

FOREIGN PATENT DOCUMENTS

| | | |
|---|---|---|
| JP | 2006339485 A | 12/2006 |
| KR | 10-0273809 B1 | 10/2002 |

(Continued)

OTHER PUBLICATIONS

International Search Report/Written Opinion issued to PCT/US2020/064524 on Apr. 9, 2021.

(Continued)

*Primary Examiner* — Nathaniel E Wiehe
*Assistant Examiner* — Theodore J Evangelista
(74) *Attorney, Agent, or Firm* — Patterson + Sheridan, LLP

(57) ABSTRACT

Embodiments of the present disclosure relate to bake apparatuses for handling and uniform baking of substrates and methods for the handling and the uniform baking of substrates. The bake apparatuses allow the substrates to be heated to a temperature greater than 50° C. without bowing of about 1 mm to about 2 mm from the edge of the substrates to the center of the substrates. The bake apparatuses heat the substrates uniformly or substantially uniformly to improve substrate quality.

16 Claims, 7 Drawing Sheets

(56) References Cited

U.S. PATENT DOCUMENTS

| | | | | |
|---|---|---|---|---|
| 2006/0156979 | A1* | 7/2006 | Thakur | C23C 16/45546 438/476 |
| 2007/0076345 | A1* | 4/2007 | Bang | H01L 21/67259 361/234 |
| 2007/0131990 | A1* | 6/2007 | Jang | H01L 21/67778 257/291 |
| 2008/0199818 | A1 | 8/2008 | Nitadori et al. | |
| 2008/0203084 | A1 | 8/2008 | Yamaga | |
| 2013/0052599 | A1 | 2/2013 | Toyozawa | |
| 2017/0371245 | A1 | 12/2017 | Lee et al. | |
| 2018/0174868 | A1 | 6/2018 | Sugihara | |
| 2018/0315626 | A1* | 11/2018 | Franklin | H01L 21/67126 |

FOREIGN PATENT DOCUMENTS

| | | | | | |
|---|---|---|---|---|---|
| KR | 10-2004-0046085 | A | | 6/2004 | |
| KR | 20040046085 | A | * | 6/2004 | |
| KR | 10-1605721 | B1 | | 3/2016 | |
| TW | 200416773 | A | | 9/2004 | |
| WO | 2016199769 | A1 | | 12/2016 | |
| WO | WO-2019032486 | A1 | * | 2/2019 | H01L 24/11 |

OTHER PUBLICATIONS

European Search Report issued to Patent Application No. 20902948.7 on May 28, 2024.

Japanese Office Action issued to patent application No. 2022-536759 on Oct. 22, 2024.

Taiwan Office Action issued to patent application No. 109144214 on Oct. 22, 2024.

* cited by examiner

BAKE DEVICES FOR HANDLING AND UNIFORM BAKING OF SUBSTRATES

CROSS-REFERENCE TO RELATED APPLICATIONS

This application claims benefit of U.S. Provisional Patent Application Ser. No. 62/951,909, filed Dec. 20, 2019, which is herein incorporated by reference.

BACKGROUND

Field

Embodiments of the present disclosure generally relate to bake apparatuses for handling and uniform baking of substrates and methods for the handling and uniform baking of substrates.

Description of the Related Art

In the manufacture of optical devices, substrates may be heated to a temperature greater than 50 degrees Celsius (° C.), such as about 50° C. to about 300° C. Substrates, such as glass substrates, may include one or more materials that cause the substrates to bow at temperatures greater than 50° C. The one or more materials may be materials having a refractive index greater than 1.5. A substrate having a refractive index greater than 1.5 when heated to a temperature greater than 50° C. may have bowing of about 1 millimeter (mm) to about 2 mm from the edge of the substrate to the center of the substrate. Therefore, when disposed on a heated substrate support (such as a vacuum chuck, electrostatic chuck, or other substrate support operable to retain the substrate and heat the substrate via heating elements disposed therein) the edge of the substrate may not be retained on the heated substrate support resulting in non-uniform temperature across the surface of the substrate.

During, for example, post-apply baking (PAB) the non-uniform temperature across the surface of the substrate may cause non-uniform removal of solvents from a resist material disposed on the surface of the substrate resulting in a non-uniform resist layer. During, for example, post-exposure baking (PEB) the non-uniform temperature across the surface of the substrate may result in a non-uniform development (e.g., patterning) of the resist layer. Accordingly, what is needed in the art are bake apparatuses for handling and uniform baking of substrates and methods for the handling and the uniform baking of substrates.

SUMMARY

In one embodiment, an apparatus is provided. The apparatus includes a substrate holding assembly disposed on a base. The substrate holding assembly includes two or more shafts. Each shaft of the two or more shafts has extensions disposed thereon. The extensions of each shaft of the two or more shafts are operable to support one or more substrates disposed between the one or more shafts. The apparatus further includes a lid. The lid includes one or more heating elements disposed therein. The apparatus further includes a process volume formed between the lid and the base.

In another embodiment, an apparatus is provided. The apparatus includes a substrate support disposed on a base. The substrate support includes one or more heating elements and lift pins operable to support a substrate. The apparatus further includes a lid. The lid includes an edge brace coupled thereon. The edge brace includes a ring. The apparatus further includes a process volume formed between the lid and the base.

In yet another embodiment, a method is provided. The method includes disposing one or more substrates on a substrate holding assembly of a bake apparatus. The method further includes lowering a lid of the bake apparatus to form a process volume in the bake apparatus. The method further includes heating the process volume with one or more heating elements of the bake apparatus. The heating elements heat the one or more substrates uniformly or substantially uniformly.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to bake apparatuses for handling and uniform baking of substrates and methods for the handling and the uniform baking of substrates. The bake apparatuses allow the substrates to be heated to a temperature greater than 50° C. without bowing of about 1 mm to about 2 mm from the edge of the substrates to the center of the substrates. The bake apparatuses heat the substrates uniformly or substantially uniformly to improve substrate quality.

Figure 1A:
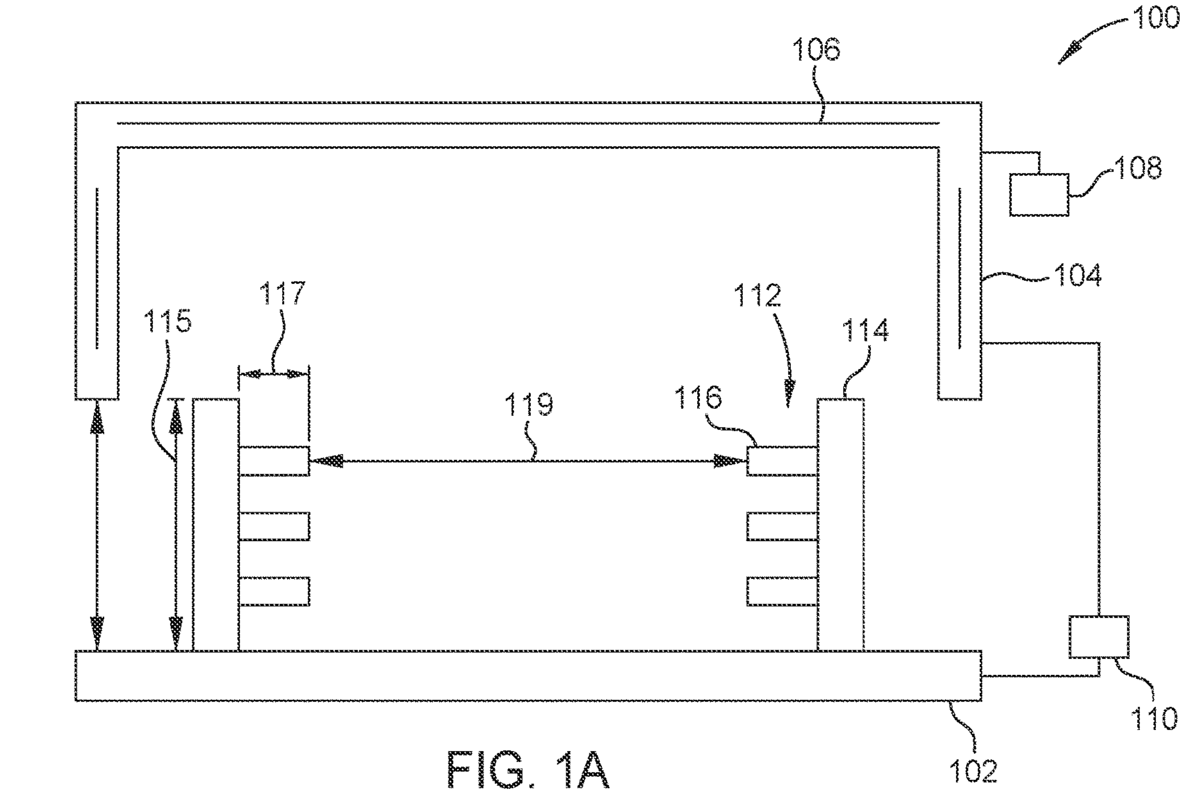
FIGS. 1A and 1B are schematic cross-sectional views of a bake apparatus according to an embodiment.
Figure 1B:
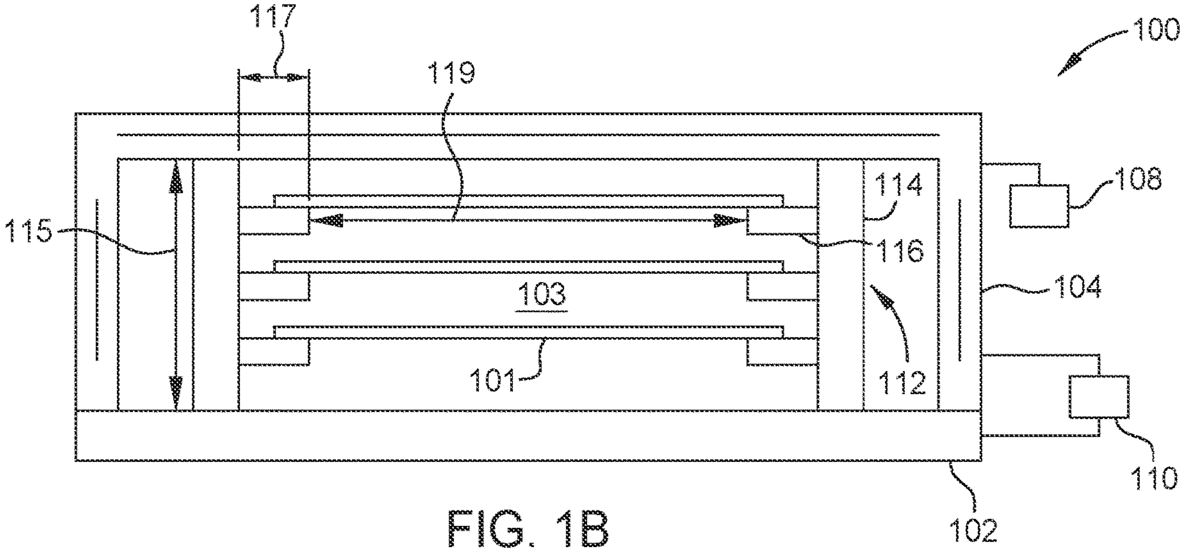

FIGS. 1A and 1B are schematic cross-sectional views of a bake apparatus 100. The bake apparatus 100 includes a base 102, a lid 104, and a substrate holding assembly 112. The substrate holding assembly 112 includes two or more shafts 114 having one or more extensions 116 coupled thereto. The shafts 114 each have a shaft height 115. In one embodiment, which can be combined with other embodiments described herein, the shaft height is between about 0.5 inch and about 5 inch.

The one or more extensions 116 of each of the shafts 114 are coupled opposite to each other such that one or more substrates 101 are supported by the extensions 116. The extension 116 is in contact with portions of the edge of each of the substrates 101. Although only three pairs of extensions 116 are shown in FIGS. 1A and 1B, more or less than three pairs of extensions 116 can be included in the bake apparatus 100. The number of pairs of extensions 116 corresponds to the number of substrates 101 in the bake apparatus 100. Each extension 116 has an extension width 117. The extension widths 117 correspond to the portion of the substrates 101 in contact with the extensions 116. In one embodiment, which can be combined with other embodiments described herein, the extension width 117 is between about 1 mm and about 10 mm. A width 119 is defined between ends of the extensions 116 disposed opposite one another. The width 119 corresponds to the portion of the substrates 101 not in contact with the extensions 116. The width 119 is between about 198 mm and about 298 mm. Although only three substrates 101 are shown in FIG. 1B, the bake apparatus 100 is configurable to hold more than three of the substrates 101. For example, the bake apparatus 100 is configurable to hold 1 to 5 of the substrates 101.

In one embodiment, which can be combined with other embodiments described herein, the one or more substrates 101 include one or more materials that are subject to bowing at a temperature greater than 50° C., such as such as about 50° C. to about 300° C. In another embodiment, which can be combined with other embodiments described herein, the one or more substrates 101 include, but are not limited to, at least one of amorphous dielectrics, non-amorphous dielectrics, crystalline dielectrics, silicon oxide, polymers, and combinations thereof. For example, the one or more substrates 101 include at least one of glass, plastic, and polycarbonate materials that are subject to bowing at a temperature greater than 50° C. In yet another embodiment, which can be combined with other embodiments described herein, the one or more substrates 101 include, but are not limited to, at least one of an oxide, sulfide, phosphide, telluride, and combinations thereof. In one example, the substrates 101 include at least one of silicon (Si), silicon dioxide ($SiO_2$), sapphire, and high-index transparent materials containing materials. In yet another embodiment, which can be combined with other embodiments described herein, the substrates 101 have a refractive index greater than 1.5. In yet another embodiment, which can be combined with other embodiments described herein, the substrates 101 include a glass material having a refractive index greater than 1.5.

In one embodiment, which can be combined with other embodiments described herein, the substrates 101 have a thickness less than about 1 mm. In one embodiment, which can be combined with other embodiments described herein, the substrates 101 have a diameter of about 200 mm. In another embodiment, which can be combined with other embodiments described herein, the substrates 101 have a diameter of about 300 mm. In another embodiment, which can be combined with other embodiments described herein, the substrates 101 have a diameter of about 4 inch to about 12 inch.

The lid 104 includes an actuator 108 operable to raise and lower the lid 104 from a raised position (shown in FIG. 1A) to a lowered position (shown in FIG. 1B). The lid 104 in the raised position allows the one or more substrates 101 to be transferred to and from the bake apparatus 100. In one embodiment, which can be combined with other embodiments described herein, the one or more substrates 101 are transferred to and from the bake apparatus 100 with a transfer robot. The lid 104 in the lowered position contacts the base 102 such that a process volume 103 is formed between the lid 104 and the base 102. The process volume 103 provides a uniform or substantially uniform temperature distribution inside the process volume of the bake apparatus 100. The process volume 103 may be heated by various heat sources. In one embodiment, which can be combined with other embodiments described herein, one or more heating elements 106 are disposed in the lid 104. The one or more heating elements 106 include, but are not limited, to a ceramic heater, a rubber heater, and a fiber glass heater. The heating elements 106 are operable heat the process volume 103 between about 50° C. to about 600° C. The heating elements 106 heat the process volume 103 such that each substrate 101 of the one or more substrates 101 is uniformly or substantially uniformly heated. Additionally, the uniform or substantially uniform temperature distribution inside the process volume 103 exposes each portion of the one or more substrates 101 to the same temperature. For example, the portions of the one or more substrates 101 positioned on the extensions 116 are heated to the same temperature as the portions of the one or more substrates 101 corresponding to the width 119.

Exposing each portion of the substrates 101 to the same temperature allows the one or more substrates 101 to be heated to the temperature greater than 50° C. without bowing. The bowing of the one or more substrates 101 is generally about 1 mm to about 2 mm from the edge of the substrates 101 to the center of the substrates 101. During post-apply baking (PAB), for example, the uniform or substantially uniform or substantially uniform temperature across the surface of the one or more substrates 101 provides for a uniform or substantially uniform resist layer over the one or more substrates 101. During post-exposure baking (PEB), for example, the uniform or substantially uniform temperature across the surface of the one or more substrates 101 provides for a uniform or substantially uniform development (e.g., patterning) of the resist layer over the one or more substrates 101.

In one embodiment, which can be combined with other embodiments described herein, the temperature the one or more substrates 101 are exposed to in the process volume 103 is increased from about 40° C. to about 800° C. The rapid temperature increase bakes the one or more substrates 101. In another embodiment, which can be combined with other embodiments described herein, the temperature the one or more substrates 101 are exposed to in the process volume 103 is decreased from about 800° C. to about 40° C. The rapid cooling of the one or more substrates is in preparation of transfer of the one or more substrates out of the process volume 103. In another embodiment, which can be combined with other embodiments described herein, the temperature the one or more substrates 101 are exposed to in the process volume 103 is maintained during a PEB process at about 80° C. to about 150° C. In yet another embodiment, which can be combined with other embodiments described herein, the temperature the substrates 101 are exposed to in the process volume 103 is maintained during a PAB process at about 80° C. to about 300° C. The embodiments of the bake apparatus 100 of FIGS. 1A and 1B include a controller 110 to control operation of the bake apparatus 100 and methods described herein. For example, the controller 110 is operable to adjust the temperature of the process volume 103 to match the desired temperature of the process volume 103.

Figure 2A:
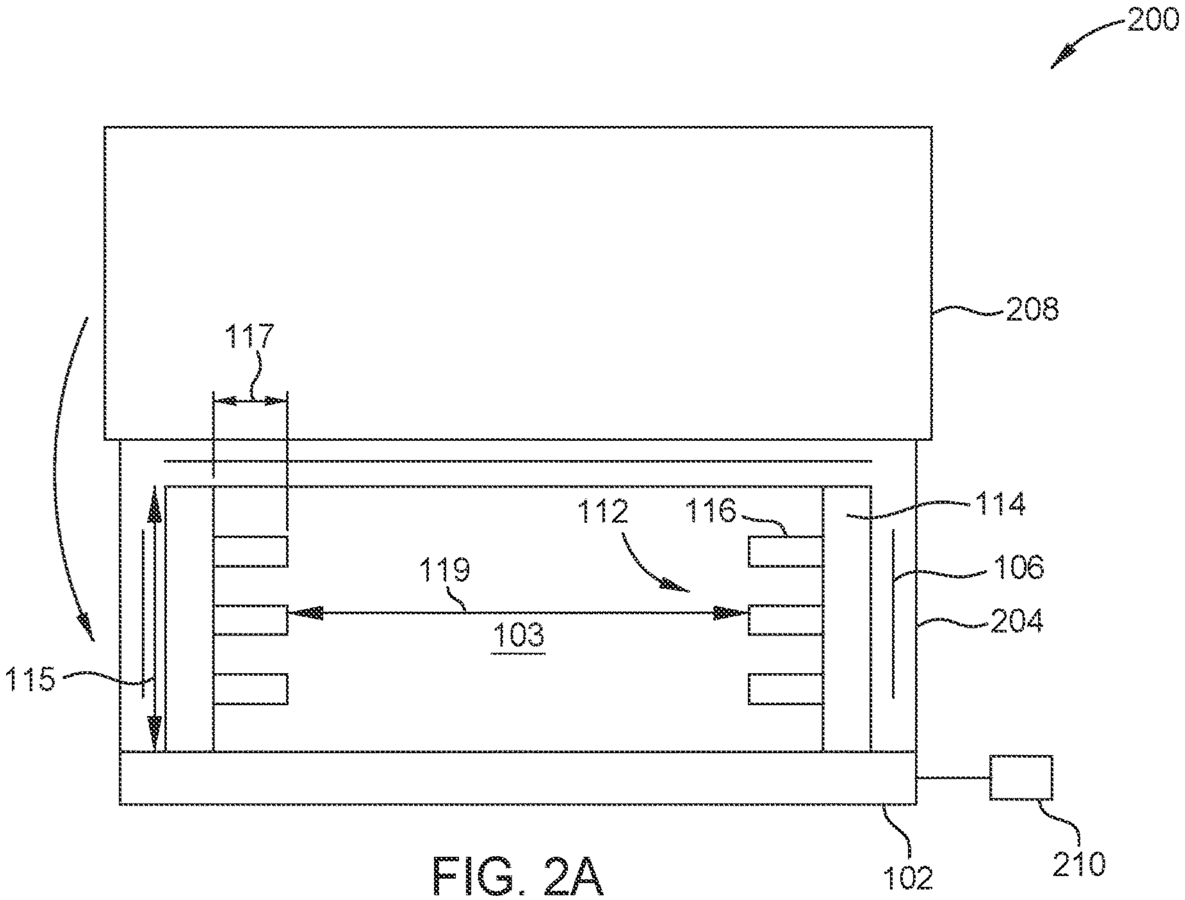
FIGS. 2A and 2B are schematic cross-sectional views of a bake apparatus according to an embodiment.
Figure 2B:
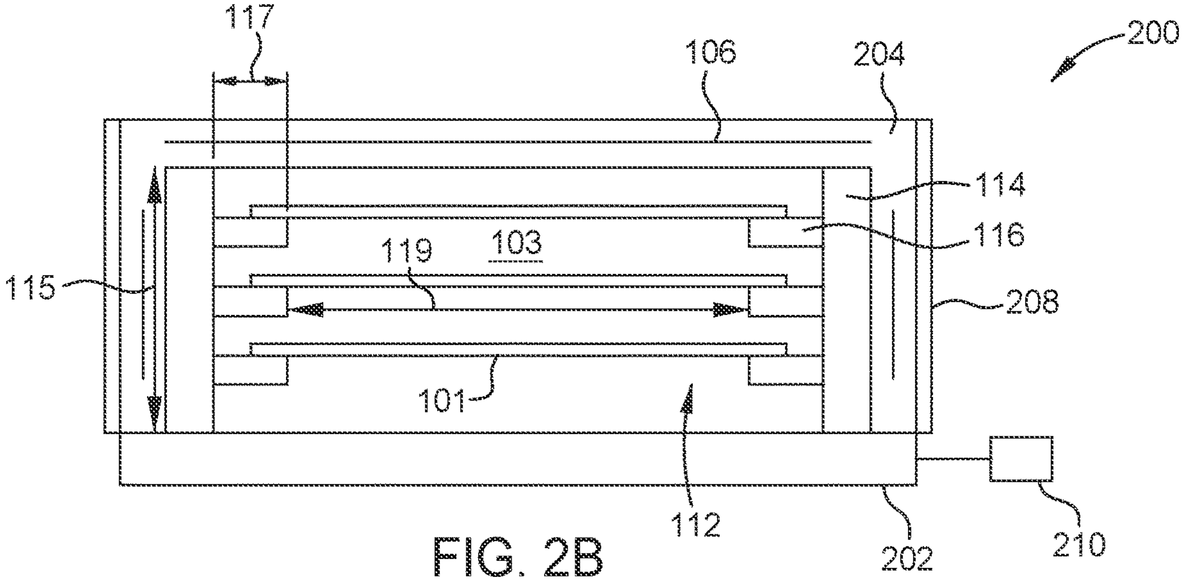

FIGS. 2A and 2B are schematic cross-sectional views of a bake apparatus 200. The bake apparatus 200 includes a base 202, a lid 204, and the substrate holding assembly 112 described herein. The lid 204 includes actuated door 208 operable to move from an open position (shown in FIG. 2A) to a closed position (shown in FIG. 2B). The lid 204 in the open position allows substrates 101 to be transferred to and from the bake apparatus 200. In one embodiment, which can be combined with other embodiments described herein, the one or more substrates 101 are transferred to and from the bake apparatus 200 with a transfer robot. The actuated door 208 in the closed position contacts the lid 204 such that a process volume 103 is formed between the lid 204 and the base 202. The process volume 103 provides the uniform or substantially uniform temperature distribution inside the process volume 103 of the bake apparatus 200. The process volume 103 may be heated by various heat sources. In one embodiment, which can be combined with other embodiments described herein, the one or more heating elements 106 are disposed in the lid 204. The one or more heating elements 106 are operable to heat the process volume 103 between about 50° C. to about 600° C. The heating elements 106 heat the process volume 103 such that each substrate 101 of the one or more substrates 101 is equally heated.

In one embodiment, which can be combined with other embodiments described herein, the temperature the one or more substrates 101 are exposed to in the process volume 103 is increased from about 40° C. to about 800° C. In another embodiment, which can be combined with other embodiments described herein, the temperature the one or more substrates 101 are exposed to in the process volume 103 is decreased from about 800° C. to about 40° C. In another embodiment, which can be combined with other embodiments described herein, the temperature the one or more substrates 101 are exposed to in the process volume 103 is maintained during a PEB process at about 80° C. to about 150° C. In yet another embodiment, which can be combined with other embodiments described herein, the temperature the substrates 101 are exposed to in the process volume 103 is maintained during a PAB process at about 80° C. to about 300° C. The embodiments of the bake apparatus 200 of FIGS. 2A and 2B include a controller 210 to control operation of the bake apparatus 200 and methods described herein.

Figure 3:
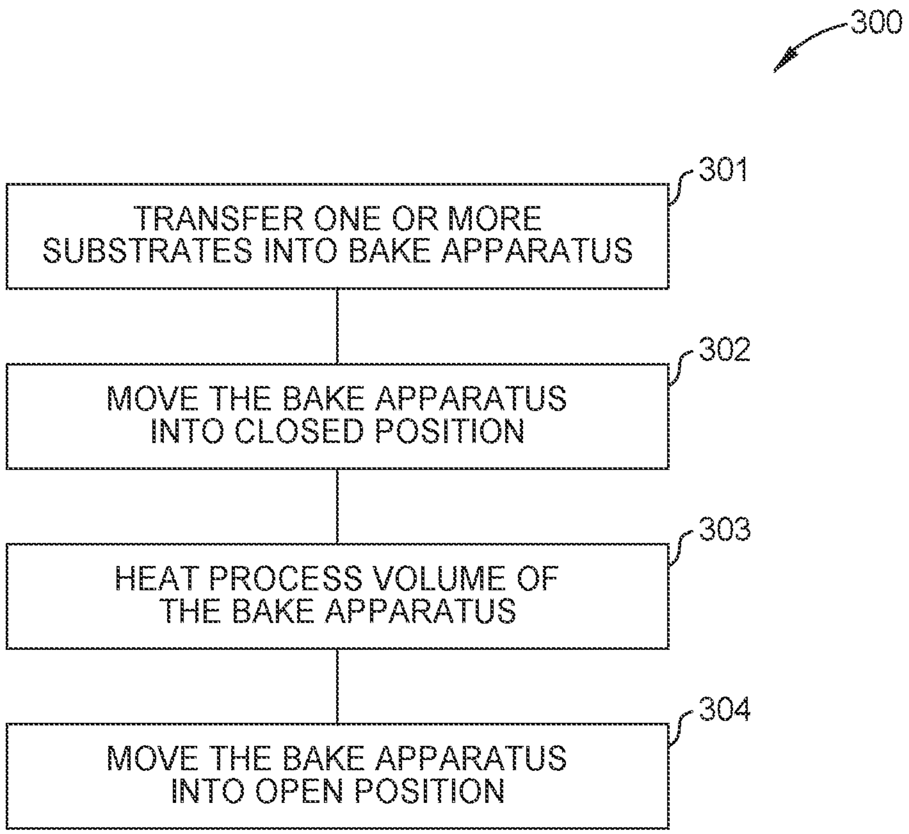
FIG. 3 is a flow diagram of a method for baking one or more substrates in a bake apparatus according to an embodiment.

FIG. 3 is a flow diagram of a method 300 for baking one or more substrates 101 in the bake apparatus 100 or the bake apparatus 200. At operation 301, the one or more substrates 101 are transferred into the bake apparatus 100 or the bake apparatus 200. Each substrate 101 of the one or more substrates 101 is placed on the extensions 116. At operation 302, the bake apparatus 100 or the bake apparatus 200 moves form the open position to the closed position. In one embodiment which can be combined with other embodiments described herein, the lid 104 is lowered by the actuator 108 to the closed position. The lid 104 contacts the base 102 and forms the process volume 103. In another embodiment, which can be combined with other embodiments described herein, the actuated door 208 is lowered to the closed position. The actuated door 208 contacts the lid 204 and forms the process volume 103.

At operation 303, the process volume 103 is heated. The process volume 103 is heated by the one or more heating elements 106. The one or more heating elements 106 are disposed in the lid 104 or the lid 204. Each substrate 101 of the one or more substrates 101 is heated equally in the process volume 103 to the desired temperature. The equal heating of the one or more substrates 101 prevents bowing of the one or more substrates 101. At operation 304, the bake apparatus 100 or the bake apparatus 200 moves form the closed position to the open position. In one embodiment, which can be combined with other embodiments described herein, the lid 104 is raised by the actuator 108 to the open positon (shown in FIG. 1A). In another embodiment, which can be combined with other embodiments described herein, the actuated door 208 is raised to the open position (shown in FIG. 2A). The one or more substrates 101 can be transferred out of the process volume 103. The controller 110 and the controller 210 are in communication with the bake apparatus 100 and the bake apparatus 200. The controller 110 and the controller 210 control the operation of the method 300 and facilitate the baking process.

Figure 4A:
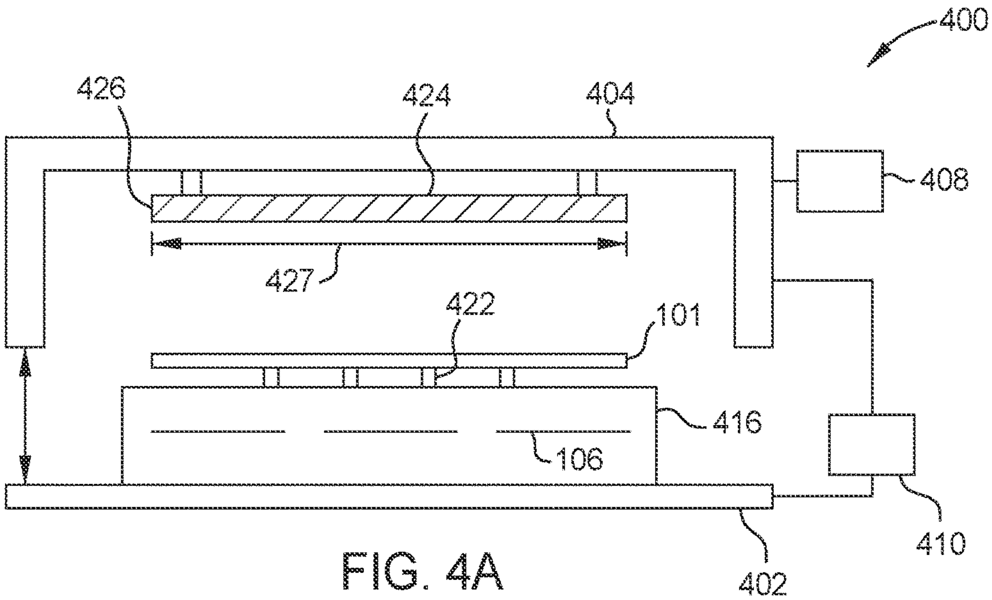
FIGS. 4A and 4B are schematic cross-sectional views of a bake apparatus according to an embodiment.
Figure 4B:
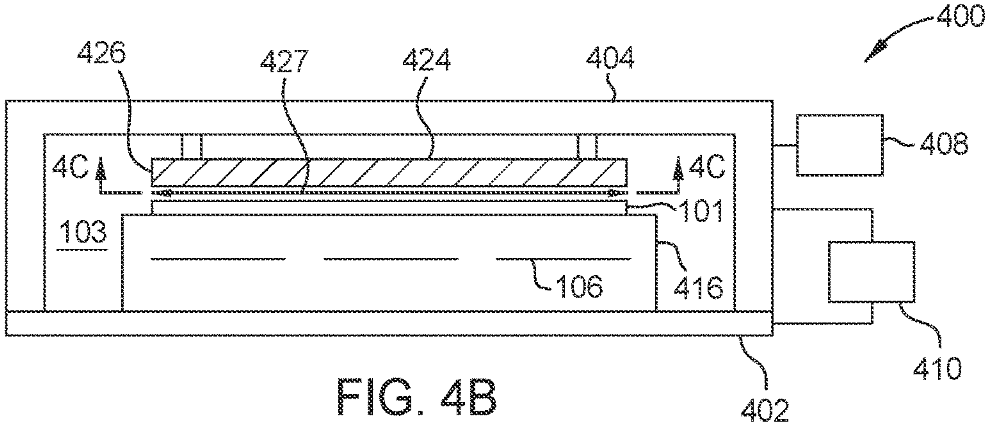
Figure 4C:
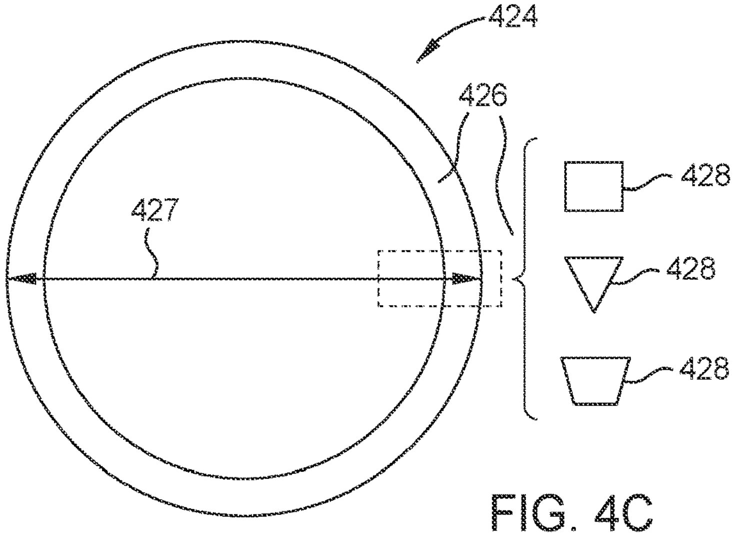
FIG. 4C is a schematic bottom view of an edge brace according to an embodiment.

FIGS. 4A and 4B are schematic cross-sectional views of a bake apparatus 400. FIG. 4C is a schematic bottom view of an edge brace 424 of the bake apparatus 400. The bake apparatus 400 includes a base 402, a lid 404, and a substrate support 416. Substrate support 416 is one of a vacuum chuck, electrostatic chuck, any other substrate support operable to retain substrates 101 described herein. The substrate support 416 is operable to heat a substrate 101 via heating elements 106 disposed therein. The one or more heating elements 106 include, but are not limited to, a ceramic heater, a rubber heater, and a fiber glass heater.

In one embodiment, which can be combined with other embodiments described herein, the temperature the substrate 101 is exposed to by the substrate support 416 is increased from about 40° C. to about 800° C. In another embodiment, which can be combined with other embodiments described herein, the temperature the substrate 101 is exposed to by the substrate support 416 is decreased from about 800° C. to about 40° C. In another embodiment, which can be combined with other embodiments described herein, the temperature the substrate 101 is exposed to by the substrate support 416 is maintained during the PEB process at about 80° C. to about 150° C. In yet another embodiment, which can be combined with other embodiments described herein, the temperature the substrate 101 is exposed to by the substrate support 416 is maintained during the PAB process at about 80° C. to about 300° C.

The lid 404 includes actuator 408 operable to raise and lower the lid 404 from a raised position (shown in FIG. 4A) to a lowered position (shown in FIG. 4B). The lid 404 in the raised position allows a substrate 101 to be transferred to and from the bake apparatus 100 and positioned on the substrate support 416. In one embodiment, which can be combined with other embodiments described herein, the substrate 101 is transferred to and from the bake apparatus 400 with a transfer robot. In one embodiment, which can be combined with other embodiments described herein, the substrate support 416 includes one or more lift pins 422. The lift pins 422 support the substrate 101. The lid 404 in the closed position contacts the base 402 such that a process volume 103 is formed between the lid 404 and the base 402.

In the closed position, a ring 426 of the edge brace 424 contacts edge portions of the substrate 101. The edge brace 424 is coupled to the lid 404. The ring 426 of the edge brace 424 contacting the edge portions of the substrate 101 forces the edge portions of the substrate 101 against the surface of the substrate support 416. The substrate 101 is subjected to a uniform or substantially uniform temperature distribution when the substrate 101 is heated by the substrate support 416. In one embodiment, which can be combined with other embodiment described herein, the lift pins 422 are recessed into the substrate support 416 when in the closed position. The lift pins 422 are recessed such that the substrate 101 is in direct contact with the substrate support 416.

The ring 426 of the edge brace 424 has a ring width 427. The ring width 427 corresponds to the diameter of the substrate 101. For example, the ring width 427 is between about 200 mm and about 300 mm. The ring 426 may have different surface profiles 428 that contact the edge portions of the substrate 101 to force the edge portions of the substrate 101 against the surface of the substrate support 416 uniformly or substantially uniformly. The surface profiles 428 include but are not limited to a rectangular, triangular, or trapezoidal shape. The embodiments of the bake apparatus 400 of FIGS. 4A-4C include a controller 410 to control operation of the bake apparatus 400 and methods described herein.

Heating each portion across the surface of the substrate 101 to the same temperature allows the substrate 101 to be heated to a temperature greater than 50° C. The heating elements 106 heat the process volume 103 between about 50° C. to about 600° C. During PAB, for example, the uniform or substantially uniform temperature across the surface of the substrate 101 provides for the uniform or substantially uniform resist layer over the substrate 101. During PEB, for example, the uniform or substantially uniform temperature across the surface of the substrate 101 provides for the uniform or substantially uniform development (e.g., patterning) of the resist layer over the substrates.

Figure 5:
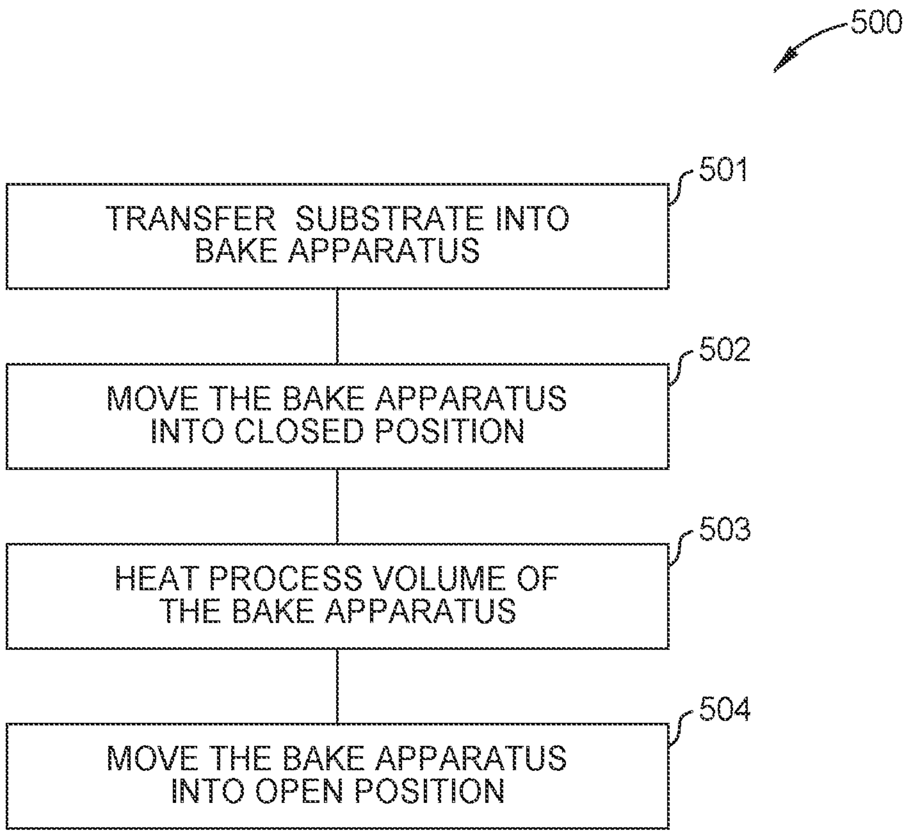
FIG. 5 is a flow diagram of a method for baking a substrate in a bake apparatus according to an embodiment.

FIG. 5 is a flow diagram of a method 500 for baking one or more substrates 101 in the bake apparatus 400. At operation 501, the substrate 101 is transferred into the bake apparatus 400. The substrate 101 is placed on the substrate support 416. At operation 502, the bake apparatus 400 moves from the open position to the closed position. The lid 404 and the ring 426 are lowered. The lid 404 is lowered by the actuator 408 such that the lid 404 contacts the base 402 and forms the process volume 103. The ring 426 is lowered such that the ring 426 contacts the substrate 101. At operation 503, the process volume 103 is heated. The process volume 103 is heated by the one or more heating elements 106 in the substrate support 416. The substrate 101 is uniformly or substantially uniformly heated in the process volume 103. The entire surface of the substrate 101 is in contact with the substrate support 416 due to the force applied by the ring 426. At operation 504, the lid 404 is raised. The lid 404 is raised by the actuator 408 such that the bake apparatus 400 is in the open position (shown in FIG. 4A). The substrate 101 can be transferred out of the process volume 103. The controller 410 controls the operation of the method 500. The controller 410 is in communication with the lid 404 and the base 402 such that the controller can control the bake apparatus 400 and facilitate the baking process.

Figure 6A:
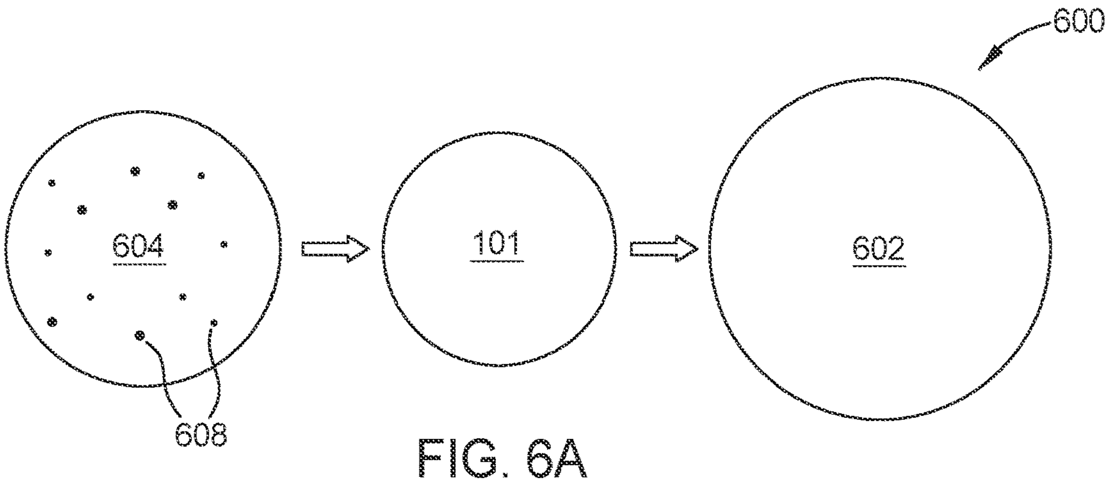
FIG. 6A is a schematic exploded view of a device according to an embodiment.
Figure 6B:
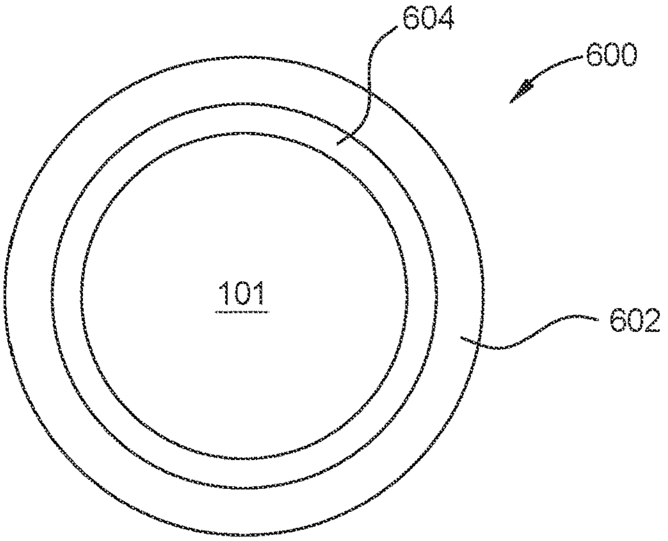
FIG. 6B is a schematic top view of a device according to an embodiment.
Figure 6C:
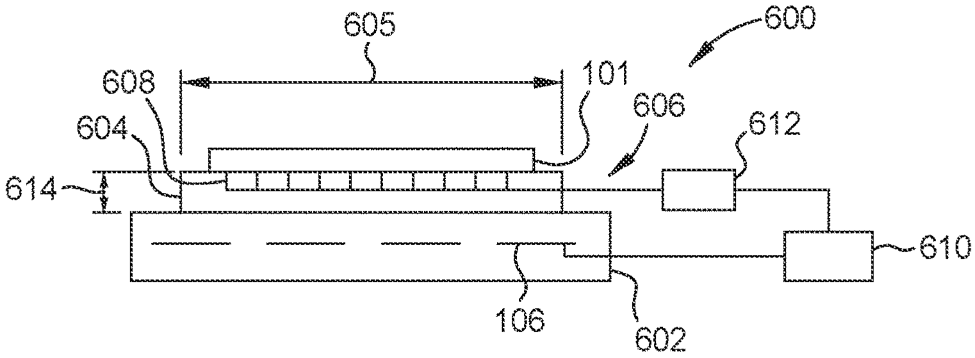
FIG. 6C is a schematic cross-sectional views of a device according to an embodiment.

FIG. 6A is a schematic exploded view of a device 600. FIG. 6B is a schematic top view of the device 600. FIG. 6C is a schematic cross-sectional view of the device 600. The device 600 includes a retention plate 604 and a heating plate 602. The retention plate 604 includes, but is not limited to, a conductive material such as ceramic, mica, or a mixture of ceramic and metal materials. The retention plate 604 has a retention plate width 605. The retention plate width 605 is between about 202 mm and about 350 mm. In one embodiment, which can be combined with other embodiments described herein, a transfer robot positions the substrate 101 on the retention plate 604. In the embodiment, the retention plate 604 moves on a track and is positioned on the heating plate 602. In another embodiment, which can be combined with other embodiments described herein, the heating plate 602 moves on a track and is positioned under the retention plate 604. In the embodiment, which can be combined with other embodiments described herein, the substrate 101 is positioned on the retention plate 604 having the heating plate 602 thereunder. In yet another embodiment, which can be combined with other embodiments described herein, the retention plate 604 and heating plate 602 move on tracks to be properly positioned relative to the other.

The retention plate 604 is one of a vacuum chuck, electrostatic chuck, or any other substrate support operable to retain substrates 101 described herein. In one embodiment, as shown in FIGS. 6A and 6C, the retention plate 604 includes a vacuum system 606 having one or more channels 608 connected to a pump 612. The pump is operable to provide suction through the channels 608 to retain a substrate 101. The retention plate 604 has a thickness 614 that allows heat provided by the heating plate 602 to dissipate uniformly or substantially uniformly across the retention plate 604. The thickness 614 is between about 1 cm and about 10 cm. The heating plate 602 is operable to heat a substrate 101 via heating elements 106 disposed therein. The substrate 101 is subjected to a uniform or substantially uniform temperature distribution when the substrate 101 is heated by the retention plate 604. The vacuum system 606 retains the substrate 101 such that the heating plate 602 is in contact with the entire surface of the substrate 101. Therefore, the entire surface of the substrate 101 is uniformly or substantially uniformly heated.

As discussed, heating each portion across the surface of the substrate 101 to the same temperature allows the substrate 101 to be heated to the temperature greater than 50° C. without bowing of about 1 mm to about 2 mm from the edge of the substrate 101 to the center of the substrate 101. In one embodiment, which can be combined with other embodiments described herein, the device 600 can be utilized in the bake apparatus 400. For example, the retention plate 604 and the heating plate 602 may replace the substrate support 416 of the bake apparatus 400.

In one embodiment, which can be combined with other embodiments described herein, the temperature the one or more substrates 101 are exposed to in the process volume 103 is increased from about 40° C. to about 800° C. In another embodiment, which can be combined with other embodiments described herein, the temperature the one or more substrates 101 are exposed to in the process volume 103 is decreased from about 800° C. to about 40° C. In another embodiment, which can be combined with other embodiments described herein, the temperature the one or more substrates 101 are exposed to in the process volume 103 is maintained during a PEB process at about 80° C. to about 150° C. In yet another embodiment, which can be combined with other embodiments described herein, the temperature the substrates 101 are exposed to in the process volume 103 is maintained during a PAB process at about 80° C. to about 300° C. The embodiments of the device 600 of FIGS. 6A-6C include a controller 610 to control operation of the device 600 and methods described herein.

Figure 7:
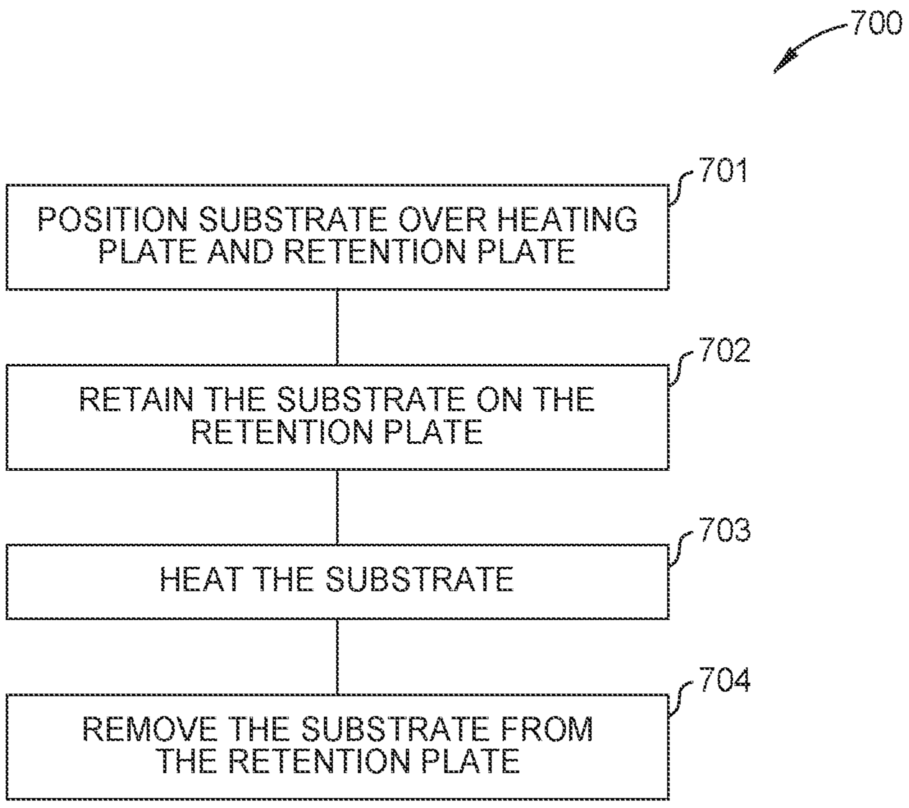
FIG. 7 is a flow diagram of a baking for heating a substrate in a bake apparatus according to an embodiment.

FIG. 7 is a flow diagram of a method 700 for heating the substrate 101 in the device 600. At operation 701, the substrate 101 is positioned over the heating plate 602 and the retention plate 604. The heating plate 602 and the retention plate 604 can be positioned relative to each other by moving on tracks. The retention plate 604 is disposed over the heating plate 602. The substrate 101 is positioned by a transfer robot. At operation 702, the substrate 101 is retained on the retention plate 604 by the vacuum system 606. The vacuum system 606 utilizes the pump 612 to provide suction through the channels 608 to retain the substrate 101 on the retention plate 604. At operation 703, the heating plate 602 provides heat to the substrate 101. The heat from the heating plate 602 passes through the retention plate 604 to heat the substrate 101. At operation 704, the substrate 101 is removed from the device 600. In one embodiment, which can be combined with other embodiments described herein, prior to the operation 703 a ring such as the ring 426 from the bake apparatus 400 is lowered into contact with the substrate 101. The ring 426 and the vacuum system 606 retain the substrate 101 on the retention plate 604 such that the substrate 101 does not bow. Therefore, the substrate 101 is uniformly or substantially uniformly heated.

In summation, bake apparatuses for handling and uniform or substantially uniform baking of substrates and methods for the handling and the uniform or substantially uniform baking of substrates are described herein. The bake apparatuses allow the substrates to be heated to a temperature greater than 50° C. without bowing of about 1 mm to about 2 mm from the edge of the substrates to the center of the substrates. The bake apparatuses heat the substrates uniformly or substantially uniformly to improve substrate quality.

While the foregoing is directed to examples of the present disclosure, other and further examples of the disclosure may be devised without departing from the basic scope thereof, and the scope thereof is determined by the claims that follow.

What is claimed is:

1. An apparatus, comprising:

a base;

two or more shafts contacting the base of the apparatus, each shaft of the two or more shafts having extensions disposed thereon, the extensions of each shaft of the two or more shafts operable to support one or more substrates disposed between the two or more shafts, each shaft of the two or more shafts having a first end and a second end;

a lid, the lid including one or more heating elements disposed therein, wherein the lid includes one of:

an actuator operable to move the lid from a raised position to a lowered position, the lid in the lowered position contacts the base to form a process volume between the lid and the base, and the second end of the two or more shafts contact the same base as contacted by the lid; and an actuated door coupled to the lid, the actuated door operable to move from an open position to a closed position, the actuated door in the closed position contacts the lid to form the process volume between the lid, the two or more shafts, and the base, the lid contacts the base and the two or more shafts.

2. The apparatus of claim 1, wherein the process volume can be heated to a temperature between about 50° C. and about 600° C.

3. The apparatus of claim 1, wherein the one or more heating elements include a ceramic heater, a rubber heater, and a fiber glass heater.

4. The apparatus of claim 1, wherein each shaft of the two or more shafts includes 1 to 5 extensions.

5. An apparatus, comprising: a base;

a substrate support disposed on the base, the substrate support including:

one or more heating elements; and lift pins operable to support a substrate; a lid, the lid including:

an edge brace coupled thereon, the edge brace including a continuous ring extending between the lid and the substrate support, the ring having an inner diameter and an outer diameter, the outer diameter corresponding to the outer diameter of the substrate; and an actuator operable to move the lid from a raised position to a lowered position to move the ring from a first position overlying the substrate at a first distance from the substrate to a second position overlying the substrate at a second distance from the substrate, wherein the second position is less than the first position; and a process volume formed between the lid and the base when this lid in the lowered position contacts the base.

6. The apparatus of claim 5, wherein the apparatus further includes a retention plate disposed on the substrate support.

7. The apparatus of claim 6, wherein the retention plate includes channels disposed therethrough, the channels in communication with a pump to form a vacuum system.

8. The apparatus of claim 7, wherein the retention plate includes a ceramic, mica, or a mixture of ceramic and metal materials.

9. The apparatus of claim 8, wherein the retention plate is positioned relative to the one or more heating elements by tracks.

10. The apparatus of claim 9, wherein the one or more heating elements is a heating plate.

11. The apparatus of claim 5, wherein the ring contacts end portions of the substrate when the lid is in the lowered position.

12. A method, comprising:

disposing one or more substrates on extensions of two shafts in a bake apparatus, the extensions of each shaft of the two shafts are operable to support the one or more substrates disposed between the two shafts, the two shafts contact a base of the bake apparatus, each of the two shafts having a first end and a second end;

forming a process volume in the bake apparatus, wherein the forming the process volume includes one of:

moving a lid of the bake apparatus via an actuator between a raised position and a lowered position, the lid in the lowered position contacts the base to form the process volume between the lid and the base, and the second end of the two or more shafts contact the same base as contacted by the lid; and moving an actuator door coupled to the lid from an open position to a closed position, the closed position contacts the lid to form the process volume between the lid, the two or more shafts, and the base, the lid contacts the base and the two or more shafts; and heating the process volume with one or more heating elements disposed in the lid of the bake apparatus, the heating elements heating the one or more substrates uniformly or substantially uniformly.

13. The method of claim 12, further comprising raising the lid of the bake apparatus to remove the one or more substrates.

14. The method of claim 12, wherein the heating the process volume includes increasing a temperature in the process volume from about 40° C. to about 800° C.

15. The method of claim 12, wherein the heating the process volume includes decreasing a temperature in the process volume from about 800° C. to about 40° C.

16. The method of claim 12, wherein the heating the process volume includes maintaining a temperature in the process volume at about 80° C. to about 300° C.

* * * * *